June 8, 1965 H. A. SCHNEIDER 3,188,453
MODULAR CARRY GENERATING CIRCUITS
Filed Dec. 14, 1961 5 Sheets-Sheet 1
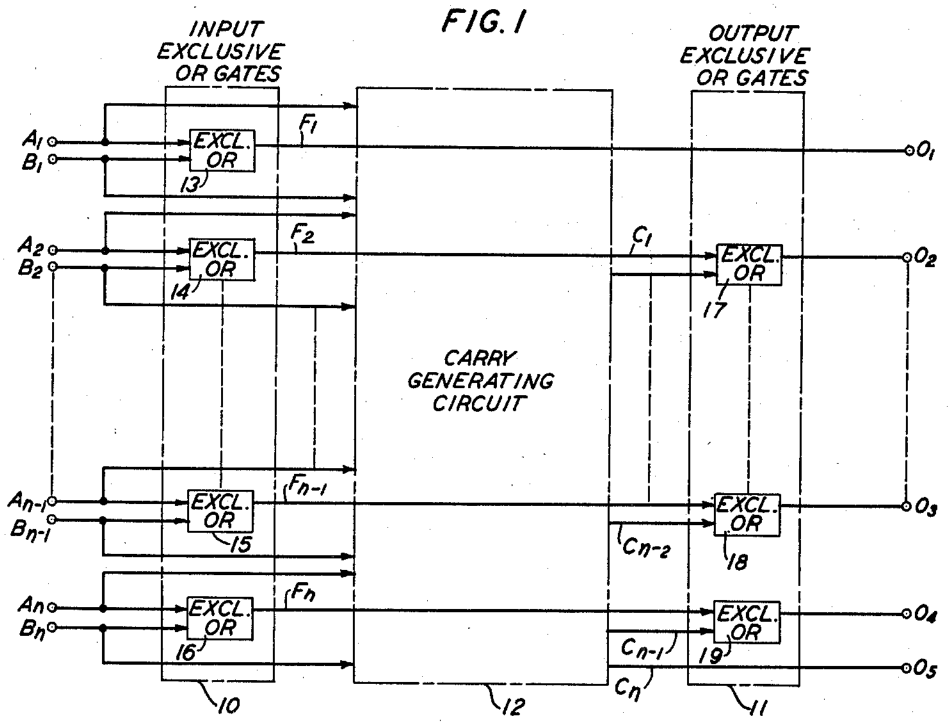
FIG. 1
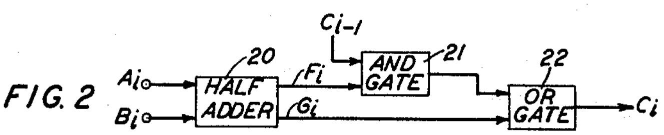
FIG. 2
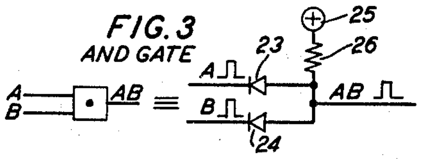
FIG. 3 AND GATE
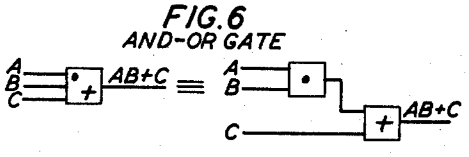
FIG. 6 AND-OR GATE
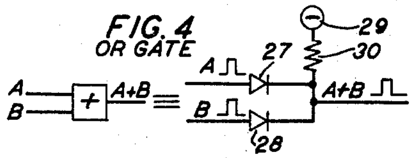
FIG. 4 OR GATE
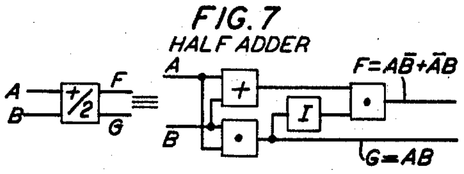
FIG. 7 HALF ADDER
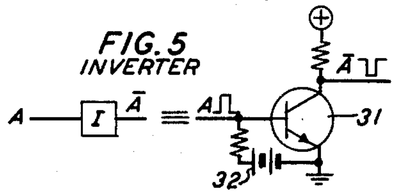
FIG. 5 INVERTER
INVENTOR
H. A. SCHNEIDER
BY [signature]
ATTORNEY June 8, 1965 H. A. SCHNEIDER 3,188,453

MODULAR CARRY GENERATING CIRCUITS

Filed Dec. 14, 1961 5 Sheets-Sheet 3

June 8, 1965 H. A. SCHNEIDER 3,188,453

MODULAR CARRY GENERATING CIRCUITS

Filed Dec. 14, 1961 5 Sheets-Sheet 4

MODULAR CARRY GENERATING CIRCUITS

Filed Dec. 14, 1961 5 Sheets-Sheet 5

United States Patent Office 3,188,453
Patented June 8, 1965

3,188,453

MODULAR CARRY GENERATING CIRCUITS

Herbert A. Schneider, Millington, N.J., assignor to Bell Telephone Laboratories, Incorporated, New York, N.Y., a corporation of New York Filed Dec. 14, 1961, Ser. No. 159,285
10 Claims. (Cl. 235—175)

This invention relates to digital data processing circuits and, more particularly, to carry and borrow generating circuits for binary arithmetic systems.

In the addition and subtraction of binary numbers, as with all numbering systems, the sum or difference of each denominational order is a function, not only of the corresponding order digits, but also of preceding or less significant orders of digits. The contribution to a sum or a difference from the lower orders of significance is usually represented as a carry or borrow digit derived by operating on the preceding digits. It is well known, however, that each carry or borrow can be expressed directly as a function of all lower order digits of the numbers being operated upon.

The carry or borrow requirements of binary addition or subtraction have given rise to two basic approaches to binary arithmetic circuits, depending on the manner of carry or borrow generation. In a first approach, which may be called "serial array" carry-borrow generation, each pair of input digits of corresponding significance is used, in conjunction with a previous carry or borrow digit, to generate the output digit for that order and a carry-borrow digit to be used for the next higher order operation. This approach requires a very minimum of circuitry, the basic circuit being duplicated only once for each digit order. The disadvange of this approach is the relatively long time delay between the application of the input digits and the appearance of the last, most significant output digit.

The second approach to carry-borrow generation takes advantage of the fact that each carry or borrow can be expressed directly as a function of the input digits of corresponding and lower significance. This approach, which may be termed "parallel array" carry-borrow generation, overcomes the main disadvantage of serial array circuitry in that the output digits appear in a minimum time after the application of the input digits. Parallel array circuitry, however, requires increases in circuitry complexity of orders of magnitude, becoming almost totally unfeasilbe for operations with a very large number of digits.

In order to resolve the difficulties of straight serial array logic and straight parallel array logic, numerous attempts have been made to compromise somewhere between these two extremes. Thus, it has been suggested that small parallel arrays be themselves arranged in a serial array to form the entire circuitry or, conversely, that small serial arrays be themselves arranged in a parallel array. Significant improvements in speed of operation over the straight serial array are possible in this way. Similarly, great reductions in circuit complexity over the straight parallel array are also possible in this way, particularly in the individual circuit blocks are chosen so as to generate the Boolean expressions repeated most often in the overall carry-borrow equations. One such series-parallel logical array for carry-borrow generation is shown in the copending application of R. S. Menne, Serial Number 123,591, filed July 12, 1961.

Combined serial-parallel arrays such as that disclosed in the above-mentioned Menne application solve the speed-complexity problem adequately, but present other problems in design. For example, the entire carry-borrow generating circuit must be designed as a unit to take maximum advantage of the redundancy in the Boolean expressions. Moreover, a wide variety of basic logic circuits is required to implement this technique, and wiring connections between these basic circuits are highly complex. This results in an inflexibility in these circuits, rendering them difficult to expand to accommodate larger numbers of digits and making the fabrication of these circuits difficult to automate.

It is an object of the present invention to combine the speed of parallel array carry-borrow generating circuits with the simplicity of serial array circuits without the attendant disadvantages of wiring complexity and inflexibility.

It is another object of the invention to implement combined serial-parallel array carry-borrow generating circuits with a few simple basic logic blocks used repetitively throughout the circuits and wire together according to a regular, easily automated wiring plan.

It is a further object of the invention to implement combined serial-parallel array carry-borrow generating circuits with basic logic arrays which are easily adjusted to accommodate fewer or a larger number of digits.

In accordance with the present invention, a plurality of identical simple basic logic blocks are arranged in a "binary array" to generate the required carry-borrow information. The term "binary array" as used herein means a regular spatial array of identical basic units corresponding in a one-for-one fashion with the digits of regular sequences of binary numbers, preferably in the conventional binary code. The wiring plan for interconnecting these basic units follows a regular pattern, relating the units in the binary array in a manner similar to the relationship of the binary digits to which they correspond.

Since the basic units of each binary array of the present invention are all identical, and since all interconnecting wiring follows a regular pattern, carry-borrow circuits in accordance with the invention are ideally suited for mass production techniques involving a high level of automation. In addition to providing reasonable speed of response and reasonable circuit costs, the present invention also allows a high degree of flexibility since units accommodating a given number of digits can be combined in easily comprehended patterns to accommodate a much larger number of digits or, conversely, broken down into smaller arrays accommodating smaller numbers of digits.

These and other objects and features, the nature of the present invention and its various advantages, may be more readily understood upon a consideration of the attached drawings and of the following detailed description of the drawings.

In the drawings:

FIG. 1 is a schematic block diagram of a generalized binary adding circuit useful in the description of the present invention;

FIG. 2 is a block diagram of one appropriate circuit arrangement for generating carry digits in a binary adding circuit such as that shown in FIG. 1;

FIGS. 3 through 7 illustrate certain of the symbols used in the remaining figures to explain the present invention;

Figure 8:
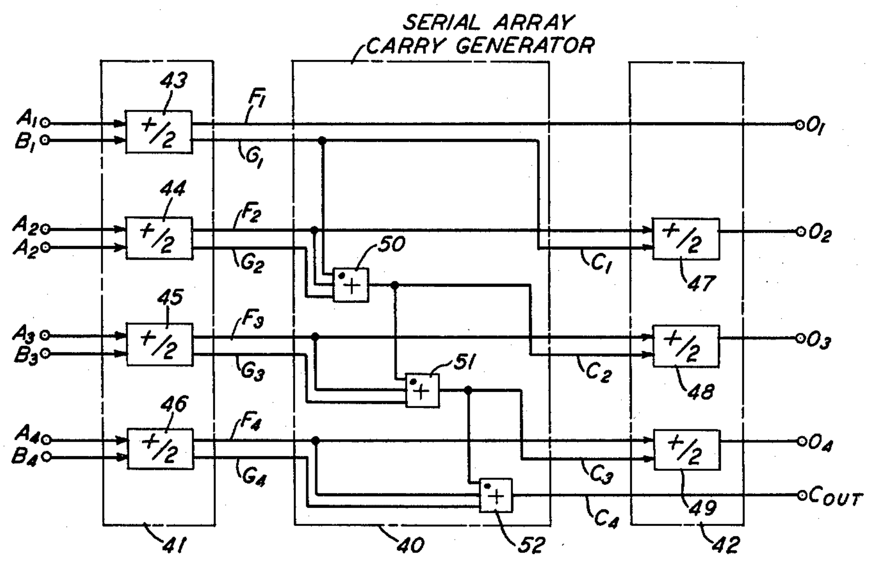
FIG. 8 is a schematic block diagram of a four-digit binary adding circuit utilizing a serial array carry generating circuit.

In the operation of binary addition, the sum of each denominational order can be expressed by the Boolean algebraic formula $$S_i=\overline{A}_i\overline{B}_iC_{i-1}+\overline{A}_iB_i\overline{C}_{i-1}+A_i\overline{B}_i\overline{C}_{i-1}+A_iB_iC_{i-1} \quad (1)$$

where $S_i$ is the sum of the *i*th order, $A_i$ and $B_i$ are the *i*th order digits of the augend and the addend numbers, respectively, and $C_{i-1}$ is the carry from the preceding order addition. The bar over a quantity represents the inverse or complement of that quantity.

Equation 1 can be rewritten as $$S_i=(\overline{A}_iB_i+A_i\overline{B}_i)\overline{C}_{i-1}+(\overline{A}_i\overline{B}_i+A_iB_i)C_{i-1} \quad (2)$$

The operation defined by the expression $$(\overline{A}_iB_i+A_i\overline{B}_i)=F_i \quad (3)$$

is the so-called EXCLUSIVE-OR operation with $A_i$ and $B_i$. Substituting Equation 3 in Equation 1, and recalling that $$\overline{(\overline{A}_iB_i+A_i\overline{B}_i)}=A_iB_i+\overline{A}_i\overline{B}_i \quad (4)$$

gives $$S_i=F_i\overline{C}_{i-1}+\overline{F}_iC_{i-1} \quad (5)$$

It can be seen that the process of binary addition can be thought of as two EXCLUSIVE-OR operations, as indicated by Equations 3 and 5, coupled with the generation of carry digits. This is illustrated in FIG. 1 for parallel digits by means of an input bank 10 of EXCLUSIVE-OR circuits, an output bank 11 of EXCLUSIVE-OR circuits and a carry generating circuit 12 separating the two. As can be seen in FIG. 1, the inputs to each of EXCLUSIVE-OR circuits 13, 14, 15 and 16 in input bank 10 comprise the respective digits of the addend and augend numbers. The inputs to EXCLUSIVE-OR circuits 17, 18 and 19 of output bank 11 comprise the functions $F_i$ and the carry digits $C_i$. The carry digits are generated from the addend and augend digits. The essential difference between various binary adding circuits analyzed in this form lies in the structure of the interconnecting carry digit generating circuit 12, i.e., the manner of generating the carry digits.

The carry digit can be expressed as $$C_i=C_{i-1}+A_i+C_{i-1}B_i+A_iB_i \quad (6)$$

that is, a carry is required when any two or more of the three quantities $A_i$, $B_i$ and $C_{i-1}$ are both ones. Equation 6 can be rewritten as $$C_i=A_iB_i+(A_i+B_i)C_{i-1} \quad (7)$$

for ease in implementation. Equation 7 in turn can be seen to be no more than an AND gate function combining $A_i$ and $B_i$, an OR gate combination of $A_i$ and $B_i$, and an AND gate combination of $C_{i-1}$ and the output of the OR gate.

The implementation of Equation 7 can be further simplified if Equation 3 is implemented to produce an output corresponding to $G_i=A_iB_i$. This implementation is shown in block form in FIG. 2 and is identified as "half-adder" 20. Equation 7 is then implemented with AND gate 21 and OR gate 22. Half-adder 20 produces the function $F_i$ on its upper output lead and the function $G_i$ on its lower output lead. The function $F_i$ is combined with $C_{i-1}$ (from the next lower stage) in AND gate 21. The output of AND gate 21 is combined with $G_i$ in OR gate 22.

It will be noted that the function $F_i$ is utilized in FIG. 2 in place of the function $(A_i+B_i)$. The function $F_i$, as will be remembered, is a "1" when either one of inputs $A_i$ or $B_i$ is a "1" while the other is "0." This of course, is the EXCLUSIVE-OR function. The function $(A_i+B_i)$ includes these same conditions and in addition, the condition when $A_i$ and $B_i$ are both "1's." Since $G_i=A_iB_i$ is applied directly to OR gate 22, it will always produce an output from OR gate 22 when $A_i$ and $B_i$ are both "1's," and the implementation of FIG. 2 will produce the proper $C_i$ in each and every case.

In order to simplify the disclosure of the present invention, certain symbols have been used in the drawings. The meaning of these symbols and illustrative circuits for performing the corresponding operations is indicated in FIGS. 3 through 7.

Referring to FIG. 3, there is shown the symbol for a logical AND gate. An AND gate is a circuit having a plurality of inputs and a single output and which produces an output when, and only when, all inputs are activated. As shown in FIG. 3, this operation can be implemented for two inputs by means of two diodes 23 and 24 biased by a positive voltage source 25 through a resistor 26 into their conducting condition. An output will appear at the lower terminal of resistor 26 only when both of diodes 23 and 24 are cut off by the application of positive pulses of the proper magnitude to the diodes.

In FIG. 4 there is shown the symbol for a logical OR gate. An OR gate is a circuit having a plurality of inputs and a single output and which produces an output when any one or more of its inputs are activated. As shown in FIG. 4, this operation can be implemented for two inputs by means of two diodes 27 and 28 biased by a negative voltage source 29 through a resistor 30 to their conducting condition. An output will appear at the lower terminal of resistor 30 when a pulse of positive polarity is applied to either one or both of diodes 27 and 28.

In FIG. 5 there is shown the symbol for a logical inverter circuit. An inverter is a circuit having a single input and a single output and which produces at its output the inverse or complement of the signal applied to its input. As shown in FIG. 5, this operation can be implemented by means of a transistor 31 connected in the common emitter configuration, having its base biased slightly above cut-off by battery 32. A positive pulse applied to the base of transistor 31 will produce a negative excursion at its collector, and vice versa.

It is to be noted that the specific implementations illustrated in FIGS. 3 through 5 are not to be taken as limiting. As is well known, the AND, OR and inversion functions can be performed by many other circuit elements including vacuum tubes, magnetic cores, transistors and a wide variety of other components.

In FIG. 6 there is shown the symbol for a logical AND-OR gate which comprises, as illustrated in FIG. 6, no more than a logical AND function followed by a logical OR function. This symbol was chosen because of the appearance of the AND-OR function in the carry generating circuit of FIG. 2 and will be used extensively hereafter.

In FIG. 7 there is shown the symbol for a half-adder circuit which has two inputs and two outputs. The first output, labeled F in FIG. 7 is an EXCLUSIVE-OR function of the two inputs. The other output, labeled G is a simple AND function of the two inputs. FIG. 7 also illustrates one way in which the basic circuit components of FIGS. 3 through 5 can be combined to realize a half-adder. It is to be understood, however, that numerous other circuit configurations could be used to implement the half-adder functions.

In FIG. 8 there is shown a four-digit binary adding circuit utilizing a serial array carry generating circuit. The carry generating circuit 40 is inserted between an input bank 41 of half-adder circuits and an output bank 42 of half-adder circuits. The individual half-adder circuits 43 through 49 are, of course, implemented as shown in FIG. 7 or in some other equivalent manner. Carry generating circuit 40 includes three AND-OR gates 50, 51 and 52, implemented, of course, as shown in FIG. 6. Output half-adders 47, 48 and 49 need only perform the EXCLUSIVE-OR function and hence might be implemented in a manner different from FIG. 7. For the purposes of uniformity, however, these output circuits will continue to be called half-adder circuits.

It will be noted that the serial array carry generating circuit of FIG. 8 is a straightforward implementation of Equation 7, substituting for the quantity $(A_i+B_i)$ the function $F_i$ as defined in Equation 3, and $G_i$ for the quantity $A_iB_i$, i.e., $$C_i=G_i+F_iC_{i-1} \qquad (8)$$

The serial array of FIG. 8 requires a minimum of hardware to implement since it includes only three AND-OR gates (three AND gates and three OR gates). It will be noted, however, that each carry digit requires for its generation the previous carry digit and hence the carry digits must be generated in sequence. Hence the serial array carry generating circuit of FIG. 8 has a maximum delay between the application of the input digits and the appearance of the last output digit. In the high speed data processing equipments in use or contemplated for use at the present time, this amount of delay may become intolerable, particularly where quantities represented by a large number of digits must be added.

Figure 9:
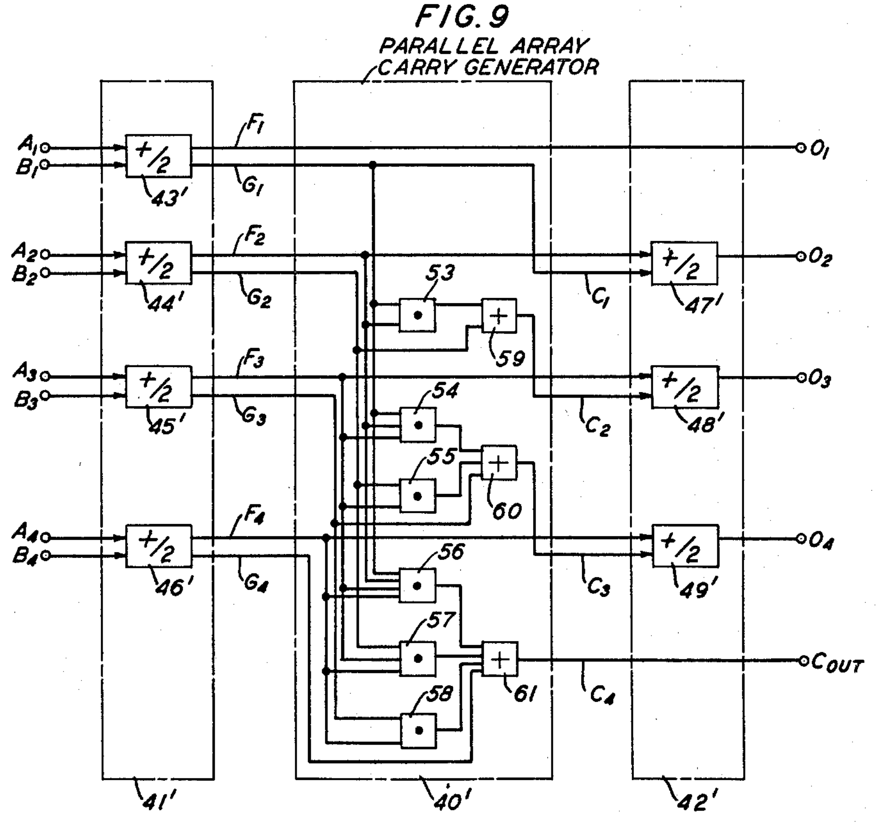
FIG. 9 is a schematic block diagram of a four-digit binary adding circuit utilizing a parallel array carry generating circuit.

The binary adding circuit of FIG. 9 illustrates one attempt to overcome the major disadvantage of the serial array adding circuit of FIG. 8. In FIG. 9 there is shown a four-digit binary adding circuit utilizing a parallel array carry generating circuit. The parallel array carry generating circuit 40′ is inserted between input bank 41′ of half-adder circuits 43′ through 46′ and output bank 42′ of half-adder circuits 47′ through 49′. Carry generating circuit 40′ includes six AND gates 53 through 58 and three OR gates 59, 60 and 61.

The circuit arrangement of the parallel array carry generating circuit 40′ in FIG. 9 can be derived from expressions for the individual carry digits arrived at by carrying out the iterative process defined by Equation 8. Carrying out this process gives $$C_1=G_1$$
$$C_2=G_2+F_2\cdot G_1$$
$$C_3=G_3+F_3\cdot G_2+F_3\cdot F_2\cdot G_1$$

and (9)

$$C_4=G_4+F_4\cdot G_3+F_4\cdot F_3\cdot G_2+F_4\cdot F_3\cdot F_2\cdot G_1$$

It can easily be seen that the parallel array carry generating circuit 40′ in FIG. 9 is a straightforward implementation of Equations 9. As might be expected, the parallel array of FIG. 9 has a minimum delay between the application of the input digits and the appearance of the last output digits. This distinct advantage, however, is offset by the extreme complexity of the carry generating circuit 40′, requiring a maximum of hardware and hence cost. For binary adding circuits serving a large number of digits, this increase in complexity becomes so great as to make the parallel array approach in many cases economically unfeasible.

In accordance with the present invention, the simplicity of the serial array carry generating circuits and the speed of the parallel array carry generating circuits are combined in a single structure having a complexity very much less than that of the parallel array structures and a speed of operation very much greater than that of the serial array structures. In addition, the circuitry for the carry generation in accordance with the present invention is ideally suited to mass fabrication techniques, requiring only a small number of different components and utilizing a regular repetitive wiring plan.

Figure 10:
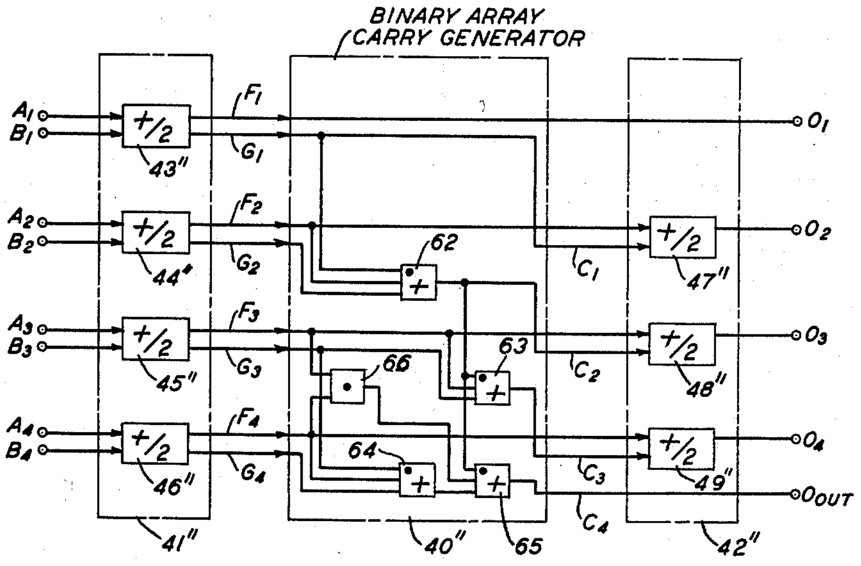
FIG. 10 is a schematic block diagram of a four-digit binary adding circuit in accordance with the present invention utilizing a binary array carry generating circuit.

In FIG. 10 there is shown a four-digit binary adding circuit utilizing a binary array carry generating circuit in accordance with the present invention. The carry generating circuit 40″ is inserted between an input bank 41″ of half-adder circuits 43″ through 46″ and output bank 42″ of half-adder circuits 47″ through 49″. Carry generating circuit 40″ includes four AND-OR gates 62 through 65 and one AND gate 66.

In order to derive the Boolean expressions representing the operations of the carry generating circuitry 40″, the iterative process defined by Equation 8 is again carried out, but this time retaining each carry digit corresponding to an integral power of two and utilizing this carry digit to generate all of the higher order carry digits. Thus, $$C_1=G_1$$
$$C_2=G_2+F_2\cdot C_1$$
$$C_3=G_3+F_3\cdot C_2$$
$$C_4=G_4+F_4\cdot G_3+F_4\cdot F_3\cdot C_2 \qquad (10)$$

It can easily be seen that the binary array carry generating circuit 40″ in FIG. 10 is a straightforward implementation of Equations 10. In order to preserve the AND-OR gates in the form of FIG. 6, i.e., with only three inputs, the processing necessary to ultimately generate the carry digit is divided into stages each represented by a column of AND-OR gates. Thus AND-OR gates 62 and 64 comprise a first stage of processing while AND-OR gates 63 and 65 comprise a second stage of processing.

It will be noted that the AND-OR gates appear in the various columns in a spatial distribution corresponding to the sequences of digits of binary numbers. That is, each horizontal row of the carry generating circuit 40″ is associated with a particular order of the digits of the addend and augend digits. The distribution of the AND-OR gates in each row corresponds precisely to the permutation of digits required to repesent one less than that order in binary notation. It is this property which forms the basis for characterizing the spatial array seen in carry generating circuit 40″ as a "binary" array.

More particularly, the first row of carry generating circuit 40″, corresponding to the first input digits $A_1$ and $B_1$, has in it no AND-OR gates in either column. This corresponds to the binary number "00," which is the binary representation of one less than the order of these digits. Similarly, the second row of circuit 40″, corresponding to the second input digit $A_2$ and $B_2$, has in it AND-OR gates in the sequence "01," reading from right to left, also one less than the order of the input digits. In like manner, the third row shows the sequence "10" and the fourth level "11." This same plan would continue for any number of input digits. It will be noted that the least significant digits appear on the left and each succeeding column represents a higher order digit.

In order to preserve the interchangeability of the basic AND-OR gates, it is necessary to provide an AND gate 66 to form the function $(F_4\cdot F_3)$. This can be seen if Equations 10 are rewritten to better indicate the individual gate operations as follows:

$$C_1=G_1$$
$$C_2=G_2+F_2\cdot C_1$$
$$C_3=G_3+F_3\cdot C_2$$
$$C_4=[G_4+F_4\cdot G_3]+(F_4\cdot F_3)C_2 \qquad (11)$$

It will be noted that $C_2$ and $C_3$ each have the form $AB+C$ generated by the AND-OR circuit of FIG. 6. The expression for $C_4$ has within the square brackets a similar expression and, provided the expression within the backets appears on a single lead (in fact generated by AND-OR gate 64 in FIG. 10), the entire expression for $C_4$ has this form, provided only that $(F_4\cdot F_3)$ be obtained on a single lead. This latter provision is secured by means of AND gate 66. The function of AND gate 66 is therefore to provide some pre-processing so that all of the AND-OR gates can have a uniform structure. This may seem to be a disadvantage, but it will be noted that no additional delay is introduced since AND gate 66 operates at the same time as AND-OR gate 64 and both make their outputs available to AND-OR gate 65 at approximately the same time.

It will be noted that, in each of the binary adders shown in FIGS. 8, 9 and 10, it has been assumed that the input digits $A_i$ and $B_i$ are available for as long as is necessary for all of the gates to be traversed and all of the outputs to appear. While this assumption is valid in some cases, in a great many applications the input digits appear as pulses having a limited duration. In order to insure a synchronized output, it is then necessary to add padding delays to the signal paths including less than the maximum number of logical gates. This delay padding is a technique well known in the art and will not be further described here except to note that it is a function of the maximum delay.

Similarly, "fan-out" problems have been ignored in these descriptions for the purposes of simplicity. That is, in order to obtain sufficient power to drive a large number of gates from a single gate, it is usually necessary to add stages of amplification and thus "fan-out" the loading requirements. Such fan-out techniques are also well known in the art and, furthermore, depend to a large extent on the exact circuit elements used to implement the logical gates.

In order to evaluate the relative merits of the series, parallel and binary array carry generating circuits in a quantitative manner, it is desirable to obtain some measuse of their respective complexities and maximum delays. If it is assumed that the individual logic circuits are implemented by means of diode circuitry as shown in FIGS. 3 and 4, then the number of diodes in the carry generating circuits will be a good measure of circuit complexity. This number, S, expressed in terms of the number of input digits N for each type of array, can be easily obtained and is as follows:

$$S\text{ (serial array)}=4(N-1)$$
$$S\text{ (parallel array)}=\tfrac{1}{6}(N+1)(N-1)(N+6)$$
$$S\text{ (binary array)}=N(3\log_2 N-2)+2 \qquad (12)$$

where $\log_2$ N is the logarithm of N to the base two. As might be expected, the serial array is the simplest, including the fewest diodes, the parallel array is the most complicated, and the binary array lies somewhere in between.

In a like manner, the maximum delay encountered in traversing the carry generating circuit is directly proportional to the maximum number of diodes which an input signal must traverse in succession to reach the output. This number, D, for each type of array can also be easily obtained and is as follows:

$$D\text{ (series)}=2(N-1)$$
$$D\text{ (parallel)}=2$$
$$D\text{ (binary)}=2\log_2 N \qquad (13)$$

where all of the symbols are as defined above. As might be expected, the parallel array has the shortest delay, the serial array the longest delay, and the binary array lies in between.

The best possible array would be one that combined the low order complexity of the serial array with the small delay of the parallel array. This theoretical minimum can be expressed as the product $S$ (serial array)$\times D$ (parallel array) or $SD_{min}$. Any array can then be evaluated by determining a figure of merit for that array which expresses the SD product of the array. These figures of merit can be normalized by dividing the SD product for that array by $SD_{min}$ as defined above. A figure of merit ratio thus expressed can therefore be used to evaluate the particular array. Since the best possible figure of merit ratio is unity, the closer a figure of merit ratio is to unity (i.e., the lower the figure of merit ratio), the better is the corresponding array.

Figure 11:
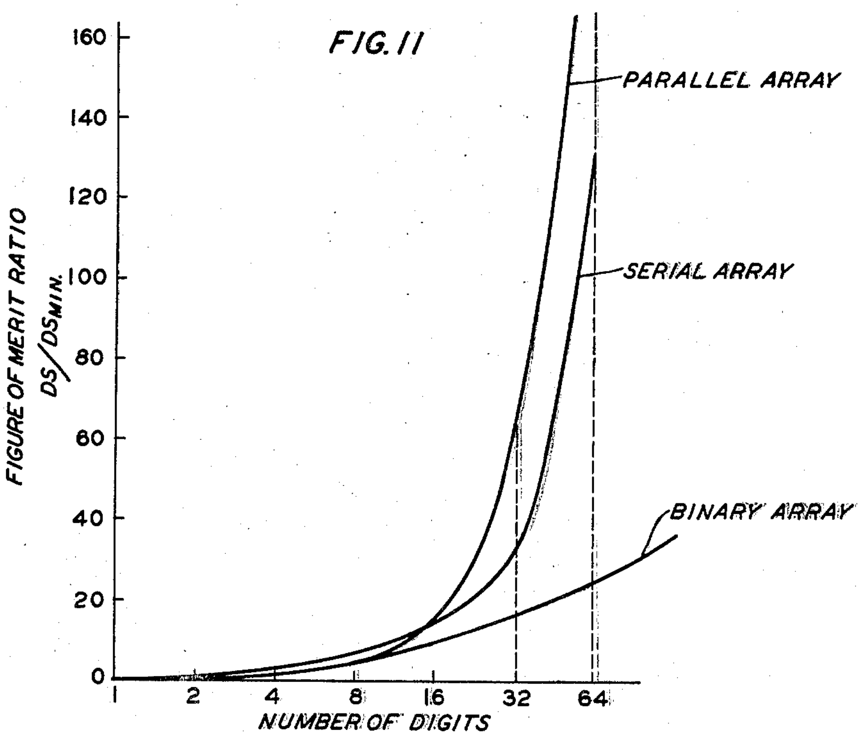
FIG. 11 is a graphical representation of the relative figures of merit for the serial, parallel and binary array carry generating circuits versus the number of input digits.

Using the above-described evaluating technique, the serial array, parallel array and binary array have been evaluated. FIG. 11 is a graphical representtion of the figure of merit ratios for each of these arrays. The abscissa is the number of input digits on a logarithmic scale and the ordinate is the figure of merit ratio. As can be seen in FIG. 11, the choice between the various arrays when the number of input digits is less than about sixteen is slight. When the number of input digits is greater than sixteen, however, it is clear that the choice of the type of array becomes very significant. In accordance with the present invention, the binary array carry generating circuit has a vastly superior figure of merit ratio when the number of input digits is greater than about sixteen and becomes more significant as the number of digits increases. In order to illustrate the simplicity of the binary array carry generating circuits for larger numbers of digits, a sixty-four digit binary counter is illustrated in FIGS. 12A and 12B.

Figure 12A:
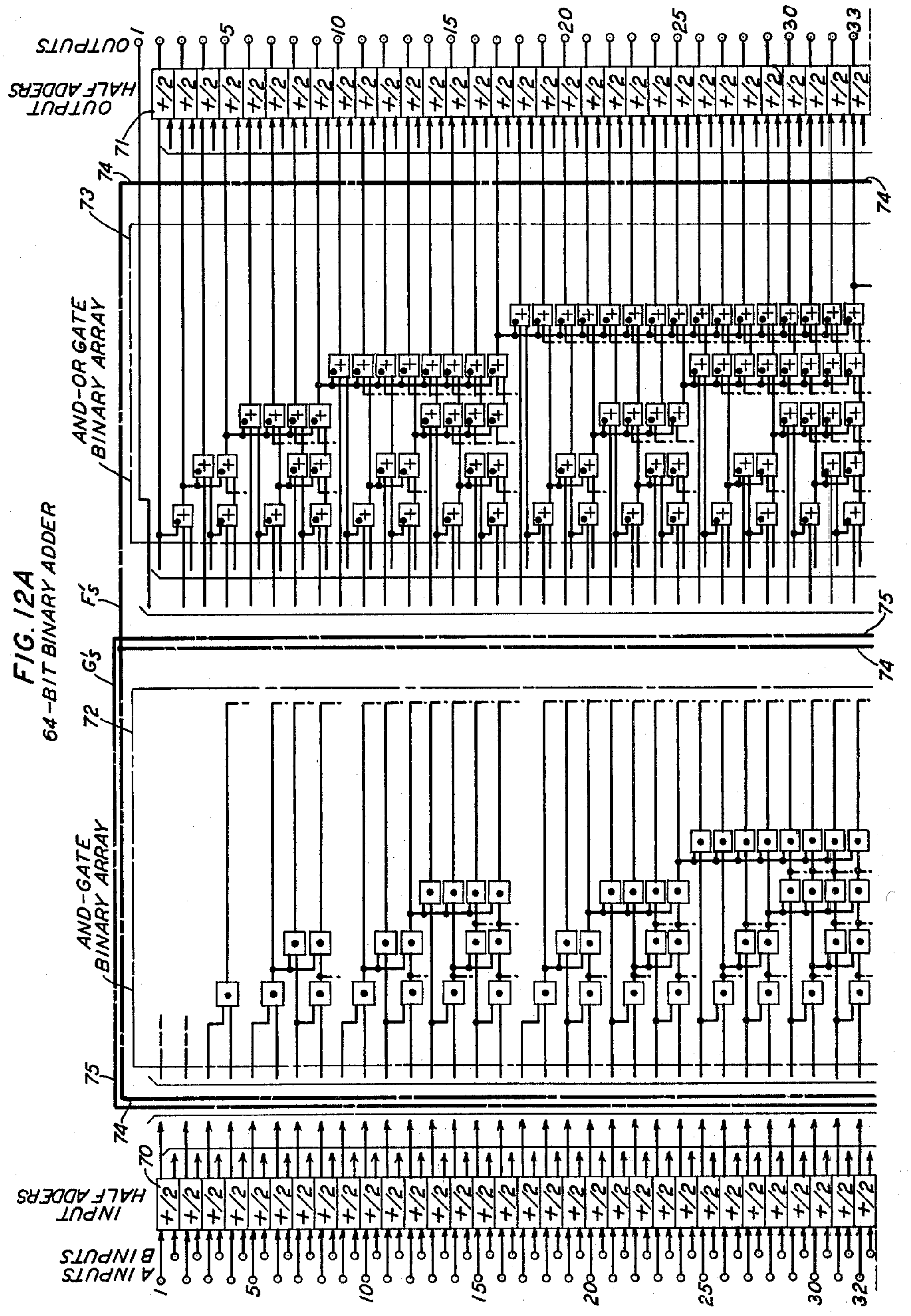
FIGS. 12A and 12B are a schematic block diagram of a sixty-four digit binary adding circuit utilizing binary array carry generating circuits in accordance with the present invention.
Figure 12B:
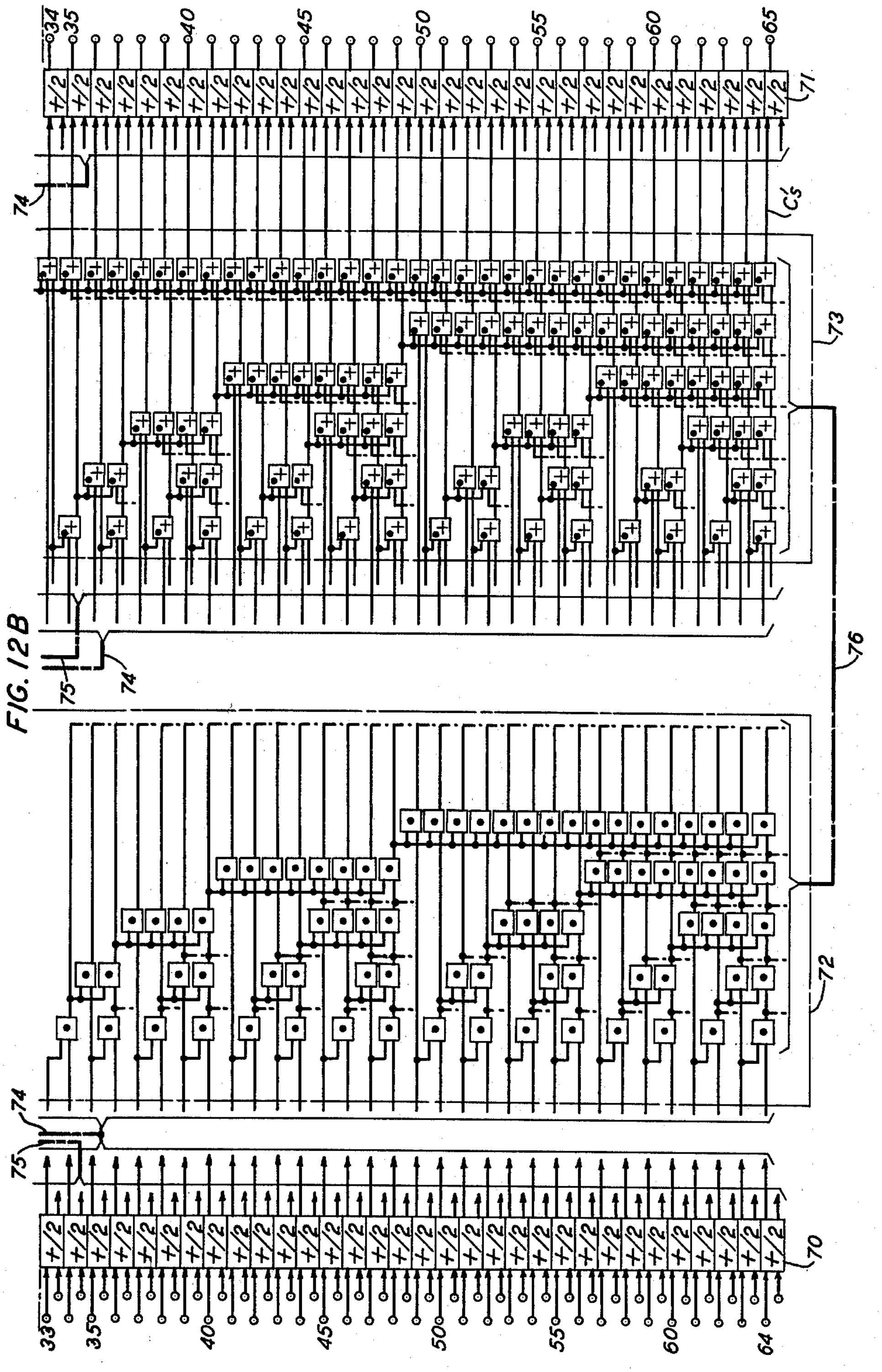

Turning then to FIGS. 12A and 12B, there is shown a sixty-four digit binary adder circuit comprising an input bank 70 of half-adder circuits and an output bank 71 of half-adder circuits. Interposed between input bank 70 and output bank 71 is a carry generating circuit comprising a binary array 72 of logical AND gates and a binary array 73 of logical AND-OR gates. The binary array AND-OR gate circuit 73 is an obvious expansion of the binary array including AND-OR gates 62, 63, 64 and 65 in FIG. 10. The AND gate array 72 is the extension of the preprocessing circuits represented by AND gate 66 in FIG. 10 and can be seen to itself form a binary array, or, at least, an array of binary arrays of increasing length. The cable represented schematically by numeral 74 carries the $F_i$ leads from input bank 70 to the various other circuits. Cable 75 carries the $G_i$ leads from input bank 70 to the various other circuits.

It will be noted that the binary adder circuit of FIGS. 12A and 12B includes only three basic circuit types, a half-adder, an AND gate and an AND-OR gate. These basic components are arranged in spatial arrangements which are easy to visualize and which require a simple, straightforward wiring plan. The outputs of array 72, for example, provide the inputs to the unconnected leads in array 73 by way of cable 76. That is, each row of binary array 72 provides the required inputs to the binary array 72 which are unconnected. More specifically, the AND gate at each coordinate of array 72 provides the required input to the AND-OR gate of array 73 in the same row and in a column of a greater depth by one.

Illustrating a complete sixty-four digit binary adder circuit and the required wiring plan in FIGS. 12A and 12B, indicates the extreme simplicity of the binary array carry generating circuits. The few basic elements required and the simple wiring plan make the binary array carry generating circuits easy to accommodate to mass production techniques such as printed circuitry. In this connection, it will be noted that array 72 and array 73 operate in parallel and not in series and hence do not accumulate delays. Hence the carry generating circuit of FIGS. 12A and 12B can be considered as comprising multiple interacting binary arrays. Furthermore, the one-for-one interconnections of the basic components of these arrays make possible the simple overlay of these arrays, thus simplifying the interconnections.

It is to be understood that the above-described arrangements are merely illustrative of numerous and varied other arrangements which might constitute applications of the principles of the invention. Such other arrangements can be readily devised by those skilled in the art without departing from the spirit or scope of the invention.

What is claimed is:

1. A carry generating circuit for binary adding means comprising a plurality of logical subnetworks interconnected to form an array of rows and columns, the presence and absence of said subnetworks in each row of said array corresponding to the presence and absence of ones in a unique digit of a binary code, the digits of said code increasing in a regular sequence in successive ones of said rows, the columns of said array thus including single subnetworks or groups of subnetworks separated by equal length spaces with no subnetworks, each said subnetwork comprising a logical AND gate and a logical OR gate, a source of pulse signals representative of binary information digits, means for applying said pulse signals to the subnetworks in the first column of said array, means for applying the output of each subnetwork of said array having a subnetwork in the next succeeding column and the same row of said array to the input of said subnetwork in the next succeeding column and the same row of said array, and means for connecting the output of one subnetwork in each group of each column of said array to the inputs of a group of subnetworks in the next succeeding column of said array.

2. Binary adding means comprising a source of addend digit signals, a source of augend digit signals, a plurality of input half-adding circuits, means for applying said addend and said augend digit signals to said input half-adding circuits, a first binary array of logical AND gates, a second binary array of logical AND-OR gates, each of said binary arrays comprising an array of said logical gates arranged in rows and columns, the gates in each column of each of said arrays being arranged in groups of $2^{(m-1)}$ gates, where $m$ is the number of that column, and means for connecting one input of all of the gates in each said group to the output of a respective one gate in the next preceding column of that array, means for connecting the outputs of said input half-adding circuits to said first and second binary arrays, means for connecting the outputs of said first binary array to certain inputs of said second binary array, a plurality of output half-adding circuits, and means for connecting the outputs of said second binary array to the inputs of said output half-adding circuits.

3. The binary adding means according to claim 2 wherein said AND-OR gates each comprise an AND gate and an OR gate, and means for connecting the output of said AND gate to one input of said OR gate.

4. In combination, a source of N binary addend digit signals $A_1$ through $A_N$, a source of N binary augend digit signals $B_1$ through $B_N$, a first bank of N binary half-adding circuits, means for applying addend and augend signals to correspondingly numbered first half-adding circuits, a first binary array of logical AND-OR circuits having rows and columns, the rows of said first array corresponding in number to said first half-adding circuits, the presence and absence of said ANDOR circuits in each row of said first array corresponding to the presence and absence of ones in the binary representation of the number $(n-1)$, where $n$ is the number of said row, a second binary array of logical AND circuits having rows and columns, the rows of said second array corresponding in number to said first half-adding circuits, each row of said second array having one less AND circuit than the number of AND-OR circuits in the corresponding row of said first array, means for connecting the output of each said AND circuit of said second array to the input of the AND-OR circuit of said first array in the corresponding row and column, a second bank of $(N-2)$ half-adding circuits, and means connecting the outputs of said first half-adding circuits to said first and second arrays and to said second bank of half-adding circuits.

5. A carry generating circuit for a binary adder comprising, in combination, a first binary array of logical subnetworks each including an AND gate and an OR gate, a second binary array of logical subnetworks each including an AND gate, means connecting the output of each AND gate of said second array to one input of the AND gate in the corresponding subnetwork of said first array, means connecting the output of each AND gate of said first array to one input of the OR gate of the same subnetwork in said first array, and means connecting the output of each OR gate of said first array to the remaining input of the OR gate in a next succeeding one of said subnetworks in said first array.

6. The carry generating circuit according to claim 5 further including an input bank of half-adding circuits, an output bank of half-adding circuits, and means for connecting said first and second binary arrays between the outputs of said input bank and the inputs of said output bank of half-adding circuits.

7. A binary array carry generating circuit for an N-digit binary adder comprising a plurality of logical OR gates wired to form a matrix of rows and columns, said matrix including N rows and a number of columns equal to the logarithm to the base two of N, rounded off to the next higher integral number, said OR gates arranged in each row of said matrix in a permutation corresponding to the permutation of the binary representation of one less than the number of that row, the output of each said OR gate being connected to one input of the next succeeding OR gate in the same row, a first logical AND gate corresponding to each said OR gate and having its output connected to the remaining input of the corresponding OR gate, a second logical AND gate corresponding to each said OR gate except the last OR gate in each row of said matrix, the output of each said second AND gate being connected to one input of the next succeeding second AND gate in the same row and to one input of the next succeeding first AND gate in the same row, means for connecting the remaining input of each said first AND gate to the output of a preceding OR gate in the same column of said array, and means for connecting the remaining input of each said second AND gate to the output of a preceding second AND gate in the same column of said array.

8. The binary array carry generating circuit according to claim 7 further including $n$ input logical half-adder circuits corresponding to the digits of addend and augend numbers, each said input half-adding circuit producing a first output when the corresponding digits are unlike and a second output when the corresponding digits are both ones, means connecting each said first output to one input of the first AND gates in the corresponding row and to one input of an AND gate in the next preceding row, and means connecting each said second output to the remaining input of the first OR gate in the corresponding row.

9. The binary array carry generating circuit according to claim 7 further including $n$ output half-adder circuits corresponding to all digits of the addend and augend numbers except the first and the last, and means connecting the output of the last OR gate in each row to one input of the corresponding half-adder circuit.

10. A carry generator for binary adding circuits comprising a first binary array of rows and columns of logical circuits, each including an AND gate and an OR gate, the permutation of said logical circuits in each row of said array corresponding to the permutation of digits in a binary representation of the number of that row, a second array of logical AND circuits having one less AND gate in each row of said second array than in the corresponding row of said first array, and means for interconnecting each said logical circuit except logical circuits in the last column of said second array only to logical circuits in succeeding columns of said arrays.

References Cited by the Examiner

UNITED STATES PATENTS

| | | | |
|---|---|---|---|
| 2,966,305 | 12/60 | Rosenberger | 235—175 |
| 3,078,039 | 2/63 | Anderson | 235—175 XR |

MALCOLM A. MORRISON, *Primary Examiner.*